(12) United States Patent
Chung

(10) Patent No.: US 8,375,935 B2
(45) Date of Patent: Feb. 19, 2013

(54) WATER HEATING APPARATUS USING SOLAR POWER

(75) Inventor: Chun-Neng Chung, Pingtung County (TW)

(73) Assignee: Fung Gin Da Energy Science and Technology Co., Ltd. (TW)

( * ) Notice: Subject to any disclaimer, the term of this patent is extended or adjusted under 35 U.S.C. 154(b) by 465 days.

(21) Appl. No.: 12/795,834

(22) Filed: Jun. 8, 2010

(65) Prior Publication Data

US 2011/0297142 A1    Dec. 8, 2011

(51) Int. Cl.
  *F24J 2/38* (2006.01)
(52) U.S. Cl. .......... 126/601; 126/651; 126/576
(58) Field of Classification Search ............ 126/601, 126/651, 573, 576
  See application file for complete search history.

(56) References Cited

U.S. PATENT DOCUMENTS

| 3,998,206 | A * | 12/1976 | Jahn | 126/578 |
| 8,168,931 | B1 * | 5/2012 | Thel | 250/203.4 |
| 8,242,424 | B2 * | 8/2012 | Gonzalez Moreno | 250/203.4 |
| 2009/0050191 | A1 * | 2/2009 | Young et al. | 136/246 |
| 2010/0000592 | A1 * | 1/2010 | Ko | 136/246 |
| 2011/0114080 | A1 * | 5/2011 | Childers et al. | 126/601 |
| 2011/0253214 | A1 * | 10/2011 | Chung | 136/259 |

* cited by examiner

*Primary Examiner* — Alfred Basichas
(74) *Attorney, Agent, or Firm* — Banner & Witcoff, Ltd.

(57) ABSTRACT

A solar power water heating apparatus includes a supporting device for supporting movably a mounting seat provided with a condensing unit on a mounting side thereof for concentrating sunlight onto a heat-conductive tube body in the mounting seat. The tube body absorbs thermal energy from the sunlight concentrated thereonto and transmits the thermal energy to water therein, thereby heating the water. The supporting device includes a disk member mounted rotatably on a hollow base body and driven by a drive unit in the base body to rotate relative to the base body in a central axis of the disk member, and a telescopic rod member and two upright supporting rods interconnecting the mounting seat and the disk member. A control module controls the drive unit and the telescopic rod member based on a solar radiating direction to move the mounting side of the mounting seat to face sunlight.

9 Claims, 9 Drawing Sheets

US 8,375,935 B2

WATER HEATING APPARATUS USING SOLAR POWER

BACKGROUND OF THE INVENTION

1. Field of the Invention

The invention relates to a water heater, and more particularly to a water heating apparatus using solar power.

2. Description of the Related Art

A conventional solar power water heater is usually disposed on a roof, and includes a supporting frame fixed on the roof for supporting a solar power collecting unit on the roof. The solar power collecting unit includes heat-conductive plate for absorbing thermal energy from sunlight and for transmitting the thermal energy to a water conduit, thereby heating water in the water conduit.

However, since the heat collecting plate is fixed, the conventional solar power water heater has an inferior solar power collecting efficiency when the heat collecting plate cannot face sunlight. Furthermore, when sunlight becomes weak, the conventional solar power water heater has decreased solar power collecting efficiency. Therefore, the conventional solar power water heater cannot ensure stable heat generation.

SUMMARY OF THE INVENTION

Therefore, an object of the present invention is to provide a water heating apparatus using solar power that can overcome the aforesaid disadvantages of the prior art.

According to the present invention, a water heating apparatus using solar power comprises:

a solar power collecting unit including
  a mounting seat having a mounting side,
  a heat-conductive tube body mounted to the mounting seat and permitting water to flow therethrough, and
  a condensing unit mounted on the mounting side of the mounting seat and disposed above the tube body for concentrating sunlight onto the tube body such that the tube body absorbs thermal energy from the sunlight concentrated by the condensing unit and transmits the thermal energy to the water therein, thereby heating the water in the tube body;

a supporting device operable to support movably the solar power collecting unit on a supporting surface, the supporting device including
  a hollow base body adapted to be disposed on the supporting surface and having a top side,
  a disk member mounted rotatably on the top side of the base body such that the disk member is rotatable relative to the base body about a central axis of the disk member that is transverse to the supporting surface,
  a drive unit disposed in the base body for driving rotation of the disk member about the central axis,
  a telescopic rod member having opposite upper and lower pivot ends connected pivotally and respectively to the mounting seat and the disk member, and
  two upright supporting rods spaced apart from each other, each of the supporting rods having a lower end fixed on the disk member, and an upper end opposite to the lower end and connected pivotally to the mounting seat; and a control module including
  a sensing unit for generating a sensing output indicating a solar radiating direction, and
  a controller coupled to the sensing unit, the drive unit and the telescopic rod member, receiving the sensing output from the sensing unit, and operable to control the drive unit and the telescopic rod member based on the sensing output received thereby such that the mounting side of the mounting seat is moved to face sunlight in response to rotation of the disk member driven by the drive unit and adjustment of the telescopic rod member in length.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
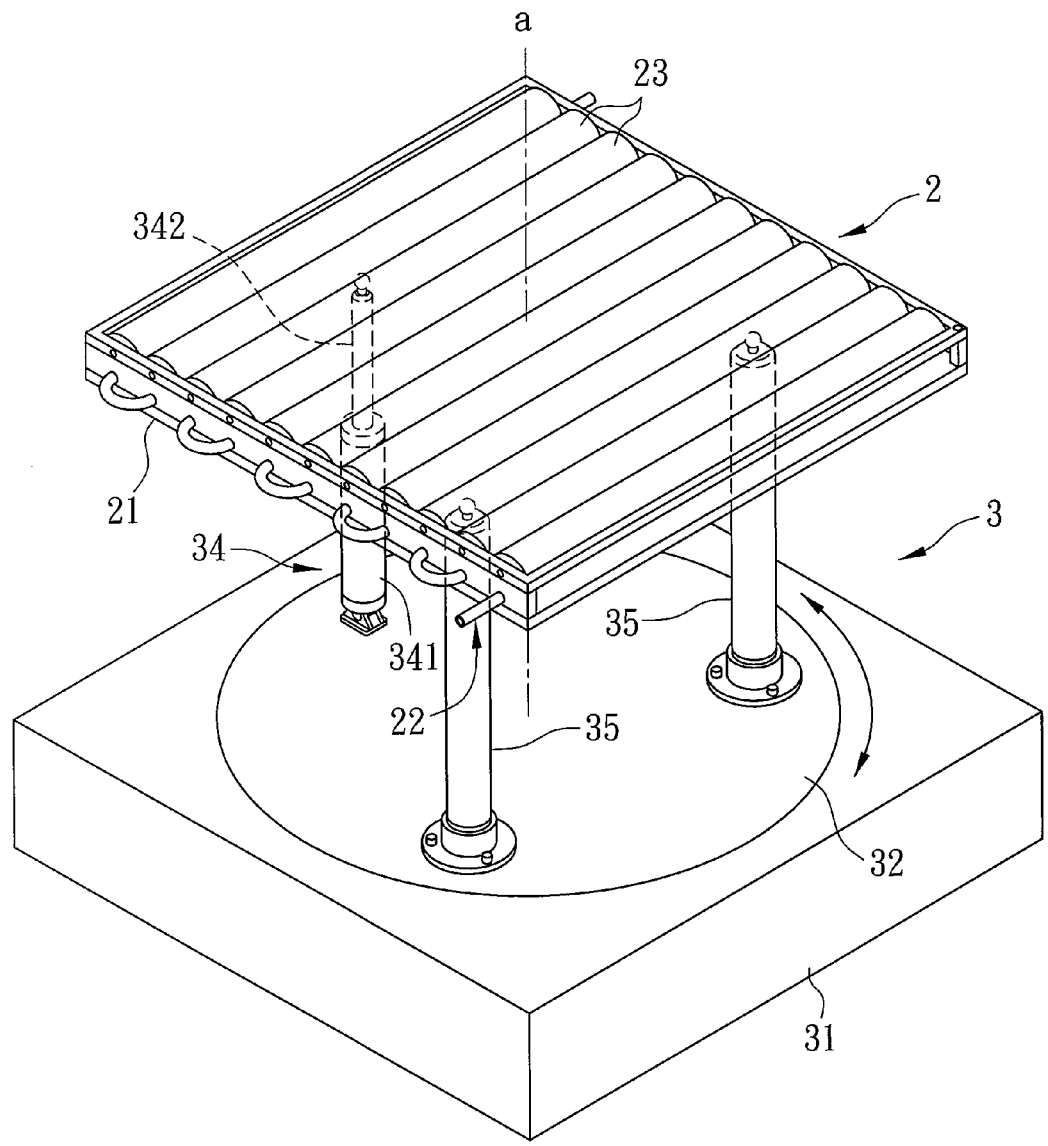
FIG. 1 is a perspective view showing the first preferred embodiment of a water heating apparatus using solar power according to the present invention.

Before the present invention is described in greater detail, it should be noted that like elements are denoted by the same reference numerals throughout the disclosure.

Figure 2:
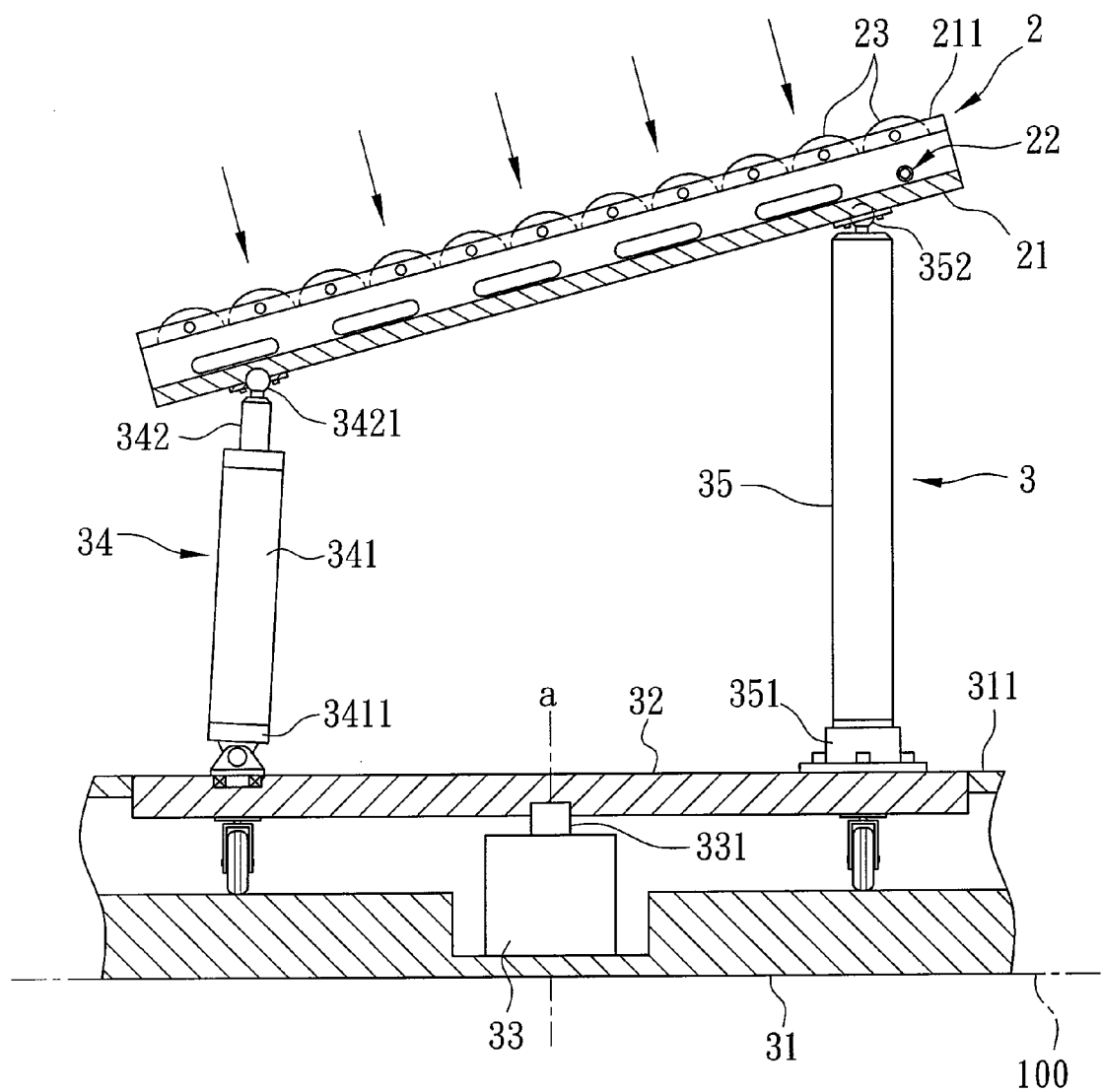
FIG. 2 is a fragmentary, partly schematic sectional view showing the first preferred embodiment when operated in a state of use.
Figure 3:
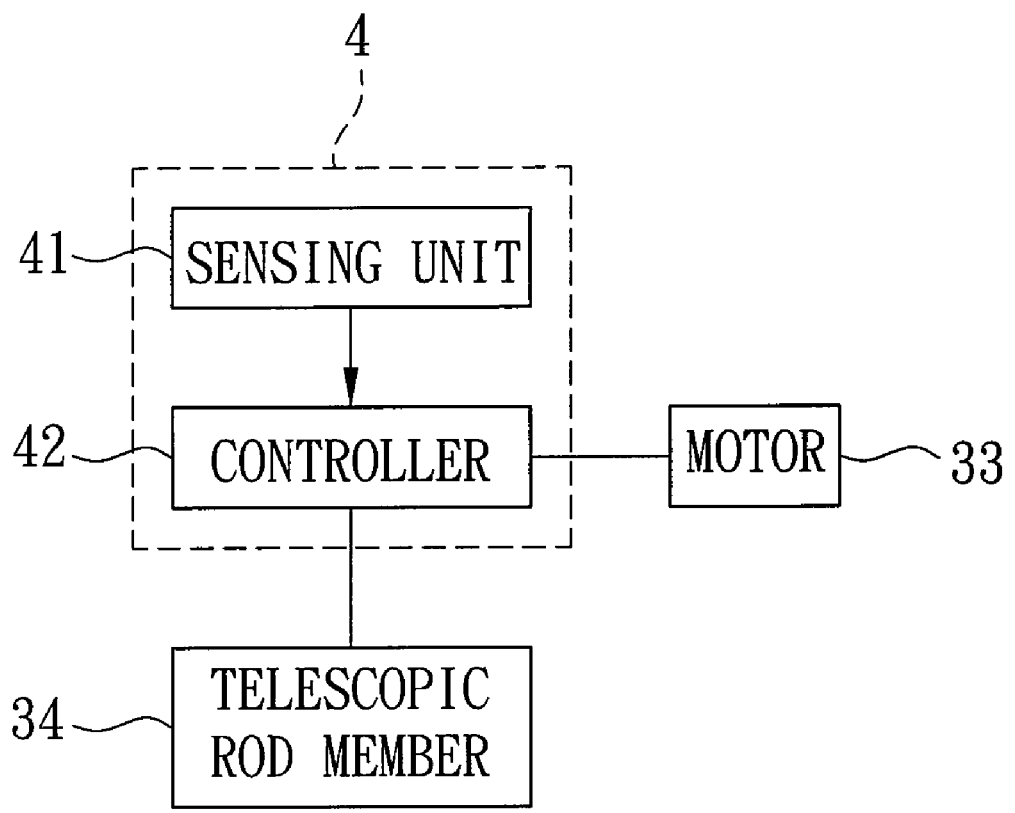
FIG. 3 is a schematic circuit block diagram illustrating the first preferred embodiment.

Referring to FIGS. 1 to 3, the first preferred embodiment of a water heating apparatus using solar power according to the present invention is shown to include a solar power collecting unit 2, a supporting device 3, and a control module 4.

The solar power collecting unit 2 includes amounting seat 21, a heat-conductive tube body 22, a condensing unit and a plurality of reflectors 24. The mounting seat 21 has a mounting side 211.

The tube body 22 is mounted to the mounting seat 21 and permits water to flow therethrough. In this embodiment, as shown in FIG. 4, the tube body 22 is folded to form a meandering shape, and includes a plurality of tube sections 221 extending in a first direction (x) and spaced apart from each other in a second direction (Y) that is transverse to the first direction (X).

The condensing unit is mounted on the mounting side 211 of the mounting seat 21, and is disposed above the tube body 22 for concentrating sunlight onto the tube body 22 such that the tube body 22 absorbs thermal energy from the sunlight concentrated by the condensing unit and transmits the thermal energy to the water therein, thereby heating the water in the tube body 22. In this embodiment, the condensing unit includes a plurality of condenser lenses 23 extending in the first direction (X) and arranged in the second direction (Y)

Figure 4:
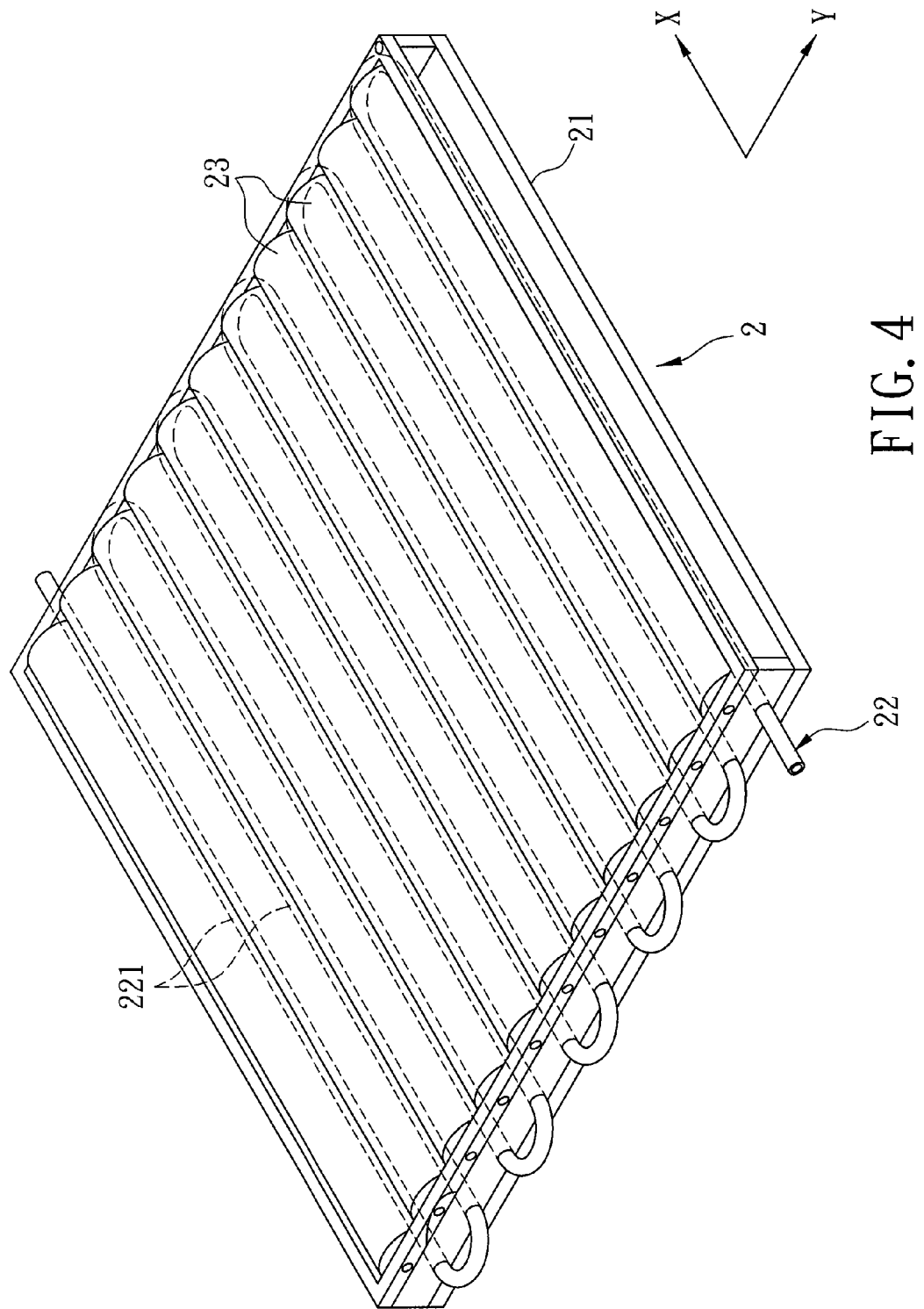
FIG. 4 is a perspective view showing a solar power collecting unit of the first preferred embodiment.
Figure 5:
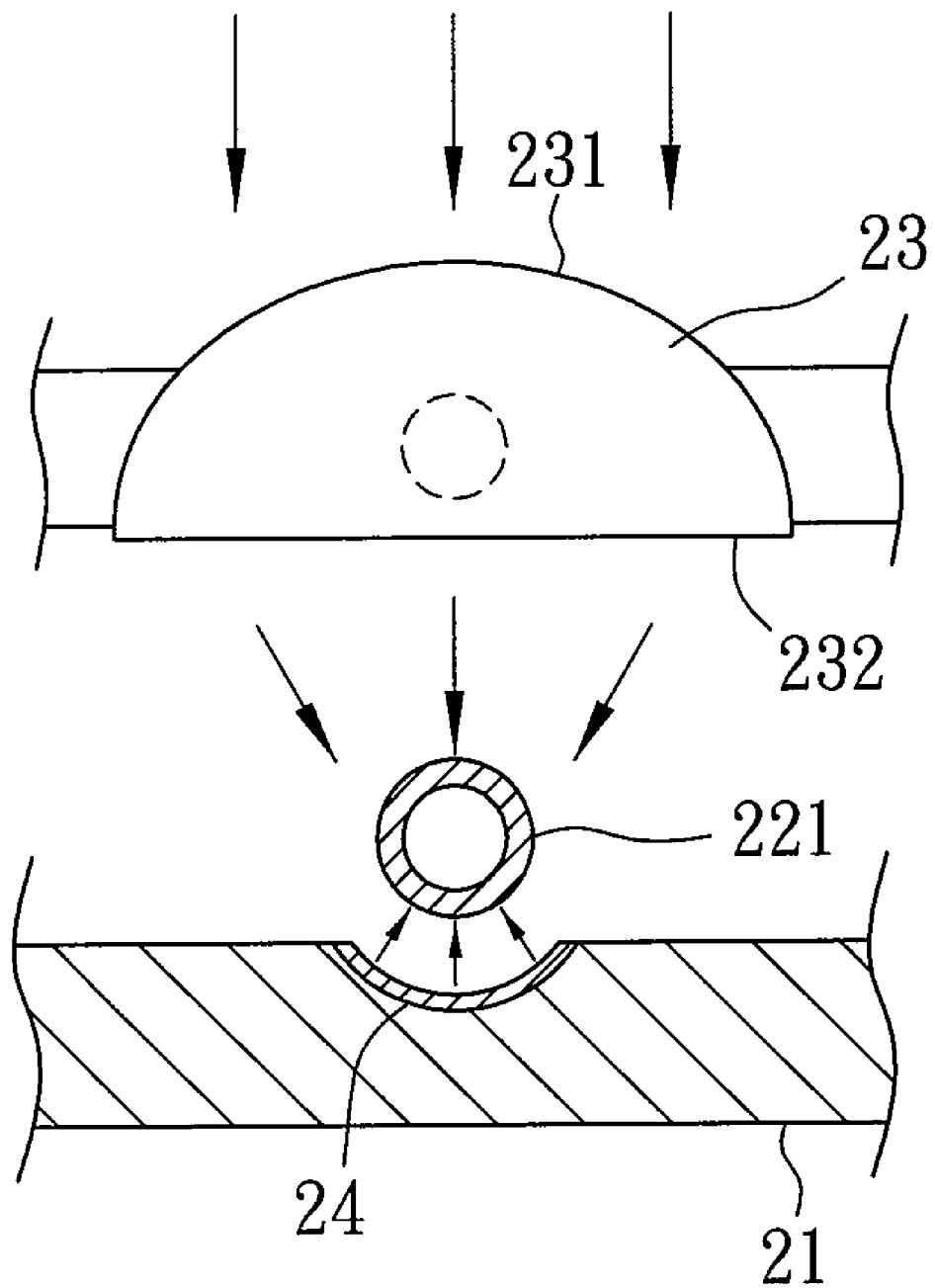
FIG. 5 is a fragmentary, partly schematic sectional view showing the solar power collecting unit of the first preferred embodiment.
Figure 6:
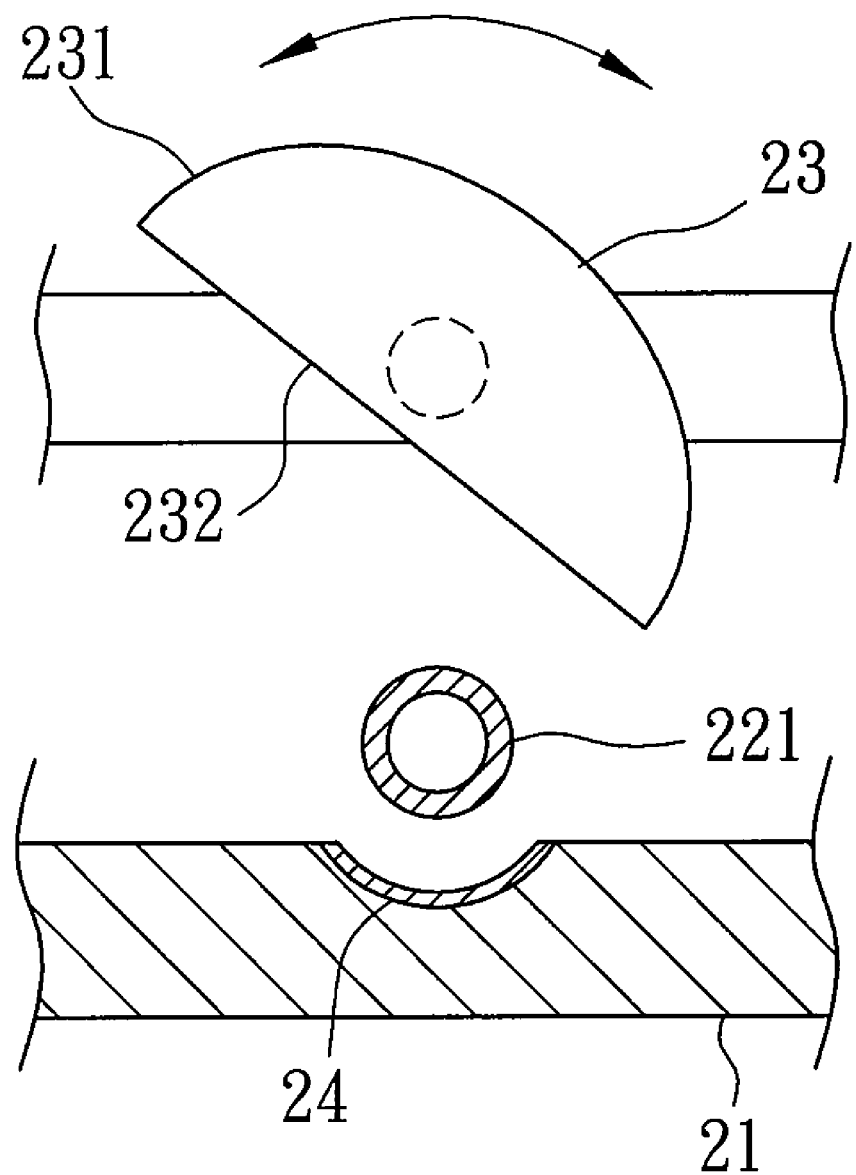
FIG. 6 is a fragmentary, partly schematic sectional view illustrating rotation of a condenser lens of the solar power collecting unit of the first preferred embodiment.
Figure 7:
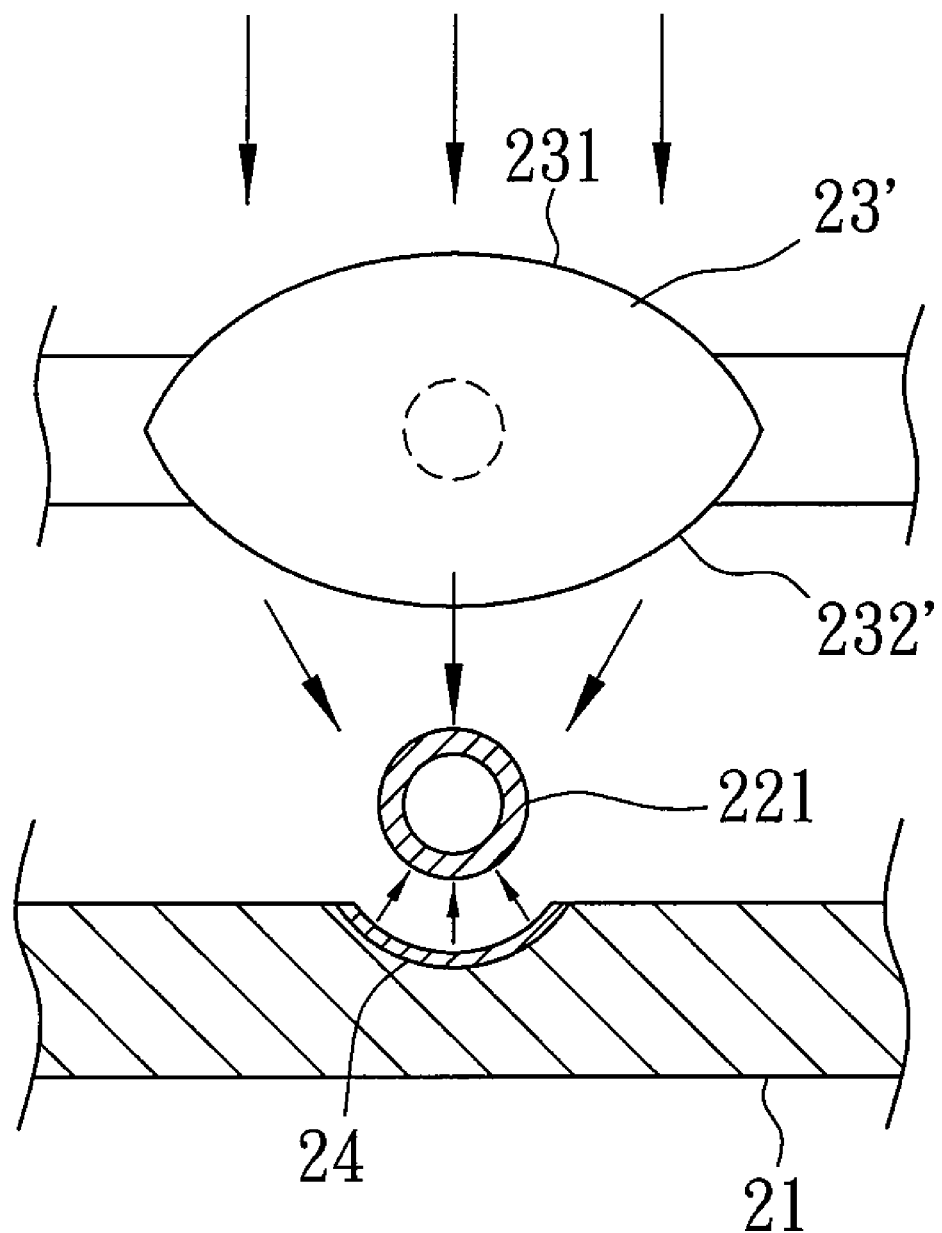
FIG. 7 is a fragmentary, partly schematic sectional view illustrating a variation of the condenser lens of the solar power collecting unit of the first preferred embodiment.

(see FIG. 4). Each condenser lens 23 is disposed spacedly above a corresponding tube section 221 of the tube body 22 such that each condenser lens 23 concentrates sunlight onto the corresponding tube section 221, as shown in FIG. 5. In addition, each condenser lens 23 is mounted rotatably on the mounting seat 21 such that each condenser lens 23 is rotatable relative to the mounting seat 21, as shown in FIG. 6, and has a convex surface 231, and a flat surface 232 opposite to said convex surface 231 and facing the corresponding tube section 221 of the tube body 22, as shown in FIG. 5. In other embodiments, as shown in FIG. 7, each condenser lens 23' has opposite convex surfaces 231, 232', wherein the convex surface 232' of each condenser lens 23' faces the corresponding tube section 221 of the tube body 22.

The reflectors 24 extend in the first direction (X), are mounted in the mounting seat 21. Each reflector 24 is disposed spacedly under a corresponding tube section 221 of the tube body 22, and reflects sunlight to the corresponding tube section 221 of the tube body 22, as shown in FIG. 5.

The supporting device 3 is operable to support movably the solar power collecting unit 3 on a supporting surface 100. The supporting device 2 includes a hollow base body 31, a disk member 32, a drive unit 33, a telescopic rod member 34, and two upright supporting rods 35.

In this embodiment, the base body 31 is adapted to be disposed on the supporting surface 100 and has a top side 311.

The disk member 32 is mounted rotatably on the top side 311 of the base body 31 such that the disk member 32 is rotatable relative to the base body 31 about a central axis (a) of the disk member 32 that is transverse to the supporting surface 100.

The drive unit is disposed in the base body 31 for driving rotation of the disk member 32 about the central axis (a). In this embodiment, as shown in FIG. 3, the drive unit includes a motor 33 having a drive shaft 331 extending along the central axis (a) and fixed on the disk member 32 such that the disk member 32 is co-rotatable with the drive shaft 331 of the motor 33.

In this embodiment, the telescopic rod member 34 is in the form of a fluid cylinder, such as an oil cylinder or a pneumatic cylinder, that has a cylinder body 341 having a lower pivot end 3411 connected pivotally to the disk member 32, and a piston rod 342 coupled movably to the cylinder body 341 and having an upper pivot end 3421 connected pivotally to the mounting seat 21 of the solar power collecting unit 2.

The supporting rods 35 are spaced apart from each other. Each supporting rod 35 has a lower end 351 fixed on the disk member 32, and an upper end 352 opposite to the lower end 351 and connected pivotally to the mounting seat 21.

Figure 8:
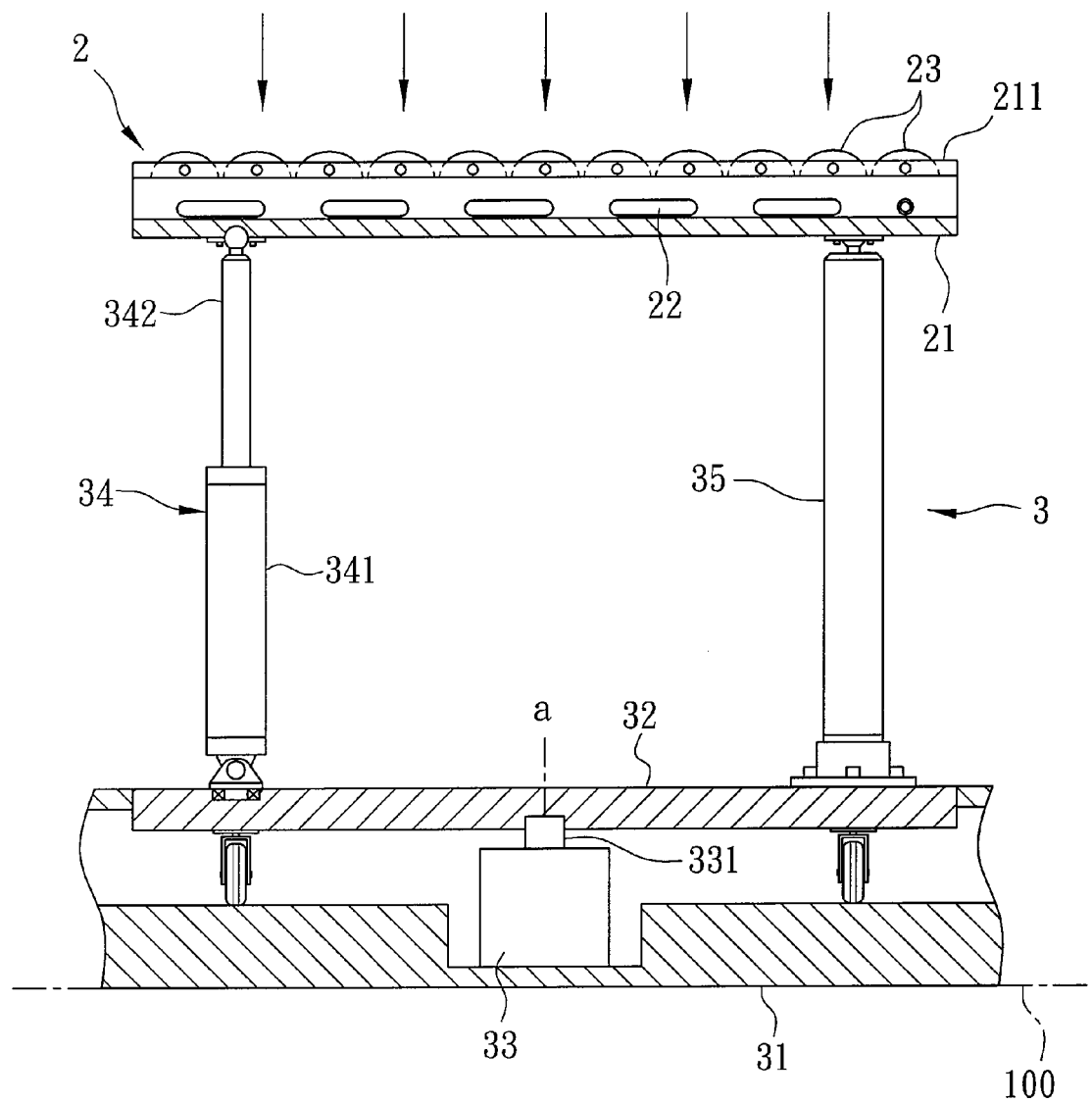
FIG. 8 is a fragmentary schematic sectional view showing the first preferred embodiment when operated in another state of use.

The control module 4 includes a sensing unit 41 and a controller 42. The sensing unit 41 generates a sensing output indicating a solar radiating direction. The controller 42 is coupled to the sensing unit 41, the motor 33 of the drive unit and the telescopic rod member 34. The controller 42 receives the sensing output from the sensing unit 41, and is operable to control the motor 33 of the drive unit and the telescopic rod member 34 based on the sensing output received thereby such that the mounting side 211 of the mounting seat 21 is moved to face sunlight in response to rotation of the disk member 32 driven by the motor 33 of the drive unit and adjustment of the telescopic rod member 34 in length, as shown in FIGS. 2 and 8.

Figure 9:
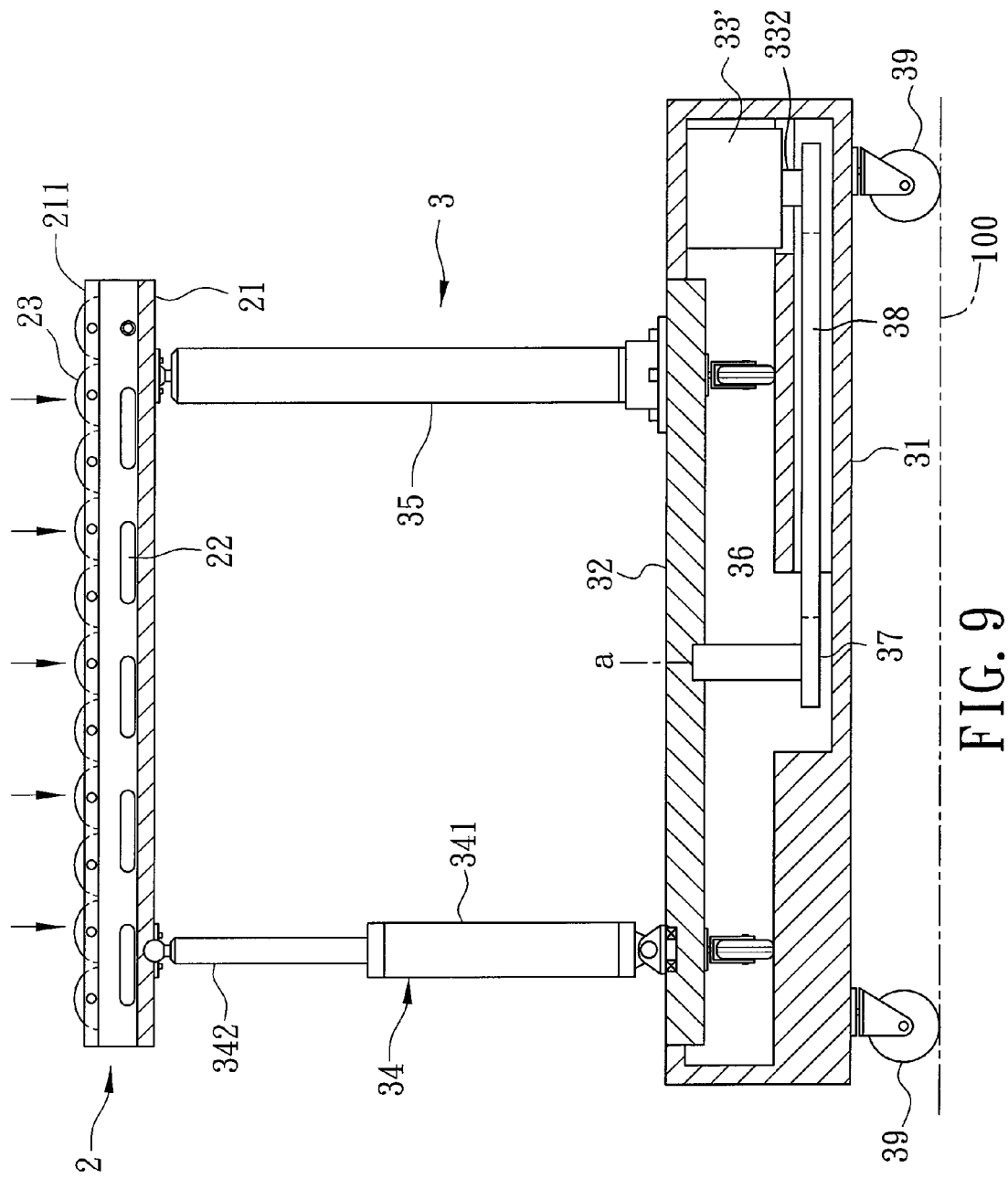
FIG. 9 is a schematic sectional view showing the second preferred embodiment of a water heating apparatus using solar power according to the present invention.

FIG. 9 illustrates the second preferred embodiment of a water heating apparatus using solar power according to this invention, which is a modification of the first preferred embodiment. In this embodiment, the drive unit includes a motor 33', a drive rod 36, a transmission wheel 37 and a looped transmission belt 38. The motor 33' is connected electrically to and controlled by the controller 42 of the control module 4, and has a motor shaft 332. The drive rod 36 extends along the central axis (a), and is fixed on the disk member 32 such that the disk member 32 is co-rotatable with the drive rod 36. The transmission wheel 37 is mounted on and is co-rotatable with the drive rod 36. The transmission belt 38 is trained on the motor shaft 332 of the motor 332 and the transmission wheel 37.

Furthermore, the supporting device 3 further includes a plurality of wheels 39 mounted on a bottom side of the base body 31 such that the base body 31 is movable relative to the supporting surface 100.

In sum, due to the presence of the sensing unit 41, the supporting device 3 can be appropriately controlled by the controller 42 such that the mounting side 211 of the mounting seat 21 is moved to face sunlight. Furthermore, the condenser lenses 23 can be operated to effectively concentrate sunlight onto the tube body 22. Therefore, the water heating apparatus of the present invention can achieve an enhanced solar power collecting efficiency, thereby ensuring stable heat generation.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A water heating apparatus using solar power, comprising:
  a solar power collecting unit including
    a mounting seat having a mounting side,
    a heat-conductive tube body mounted to said mounting seat and permitting flow of water therethrough, and
    a condensing unit mounted on said mounting side of said mounting seat and disposed above said tube body for concentrating sunlight onto said tube body such that said tube body absorbs thermal energy from the sunlight concentrated by said condensing unit and transmits the thermal energy to the water therein, thereby heating the water in said tube body;
  a supporting device operable to support movably said solar power collecting unit on a supporting surface, said supporting device including
    a hollow base body adapted to be disposed on the supporting surface and having a top side,
    a disk member mounted rotatably on said top side of said base body such that said disk member is rotatable relative to said base body about a central axis of said disk member that is transverse to the supporting surface,
    a drive unit disposed in said base body for driving rotation of said disk member about the central axis,
    a telescopic rod member having opposite upper and lower pivot ends connected pivotally and respectively to said mounting seat and said disk member, and
    two upright supporting rods spaced apart from each other, each of said supporting rods having a lower end fixed on said disk member, and an upper end opposite to said lower end and connected pivotally to said mounting seat; and
  a control module including
    a sensing unit for generating a sensing output indicating a solar radiating direction, and
    a controller coupled to said sensing unit, said drive unit and said telescopic rod member, receiving the sensing output from said sensing unit, and operable to control said drive unit and said telescopic rod member based on said sensing output received thereby such that said mounting side of said mounting seat is moved to face sunlight in response to rotation of said disk member driven by said drive unit and adjustment of said telescopic rod member in length.

2. The water heating apparatus as claimed in claim 1, wherein said telescopic rod member of said supporting device is in the form of a fluid cylinder.

3. The water heating apparatus as claimed in claim 1, wherein said drive unit includes a motor connected electrically to and controlled by said controller of said control module, and having a drive shaft extending along the central axis and fixed on said disk member such that said disk member is co-rotatable with said drive shaft of said motor.

4. The water heating apparatus as claimed in claim 1, wherein said drive unit includes:
   a motor connected electrically to and controlled by said controller of said control module, and having a motor shaft;
   a drive rod extending along the central axis, and fixed on said disk member such that said disk member is co-rotatable with said drive rod;
   a transmission wheel mounted on and co-rotatable with said drive rod; and
   a looped transmission belt trained on said motor shaft of said motor and said transmission wheel.

5. The water heating apparatus as claimed in claim 1, wherein said supporting device further includes a plurality of wheels mounted on a bottom side of said base body such that said base body is movable relative to the supporting surface.

6. The water heating apparatus as claimed in claim 1, wherein:
   said condensing unit includes a plurality of condenser lenses extending in a first direction, arranged in a second direction transverse to the first direction, and mounted rotatably on said mounting seat; and
   said tube body is folded to form a meandering shape, and includes a plurality of tube sections extending in the first direction, and disposed spacedly and respectively under said condenser lenses such that each of said condenser lenses concentrates sunlight onto a corresponding one of said tube sections of said tube body.

7. The water heating apparatus as claimed in claim 6, wherein said solar power collecting unit further includes a plurality of reflectors extending in the first direction, mounted in said mounting seat, and disposed spacedly and respectively under said tube sections of said tube body, each of said reflectors reflecting sunlight to a corresponding one of said tube sections of said tube body.

8. The water heating apparatus as claimed in claim 6, wherein each of said condenser lenses of said condensing unit has a convex surface, and a flat surface opposite said convex surface and disposed adjacent to said tube body.

9. The water heating apparatus as claimed in claim 6, wherein each of said condenser lenses of said condensing unit has opposite convex surfaces.

* * * * *